(12) United States Patent
Ros

(10) Patent No.: US 11,725,863 B2
(45) Date of Patent: Aug. 15, 2023

(54) TRANSPORT CONTAINER FOR TRANSPORTING TEMPERATURE-SENSITIVE TRANSPORT GOODS

(71) Applicant: REP IP AG, Zug (CH)

(72) Inventor: Nico Ros, Riehen (CH)

(73) Assignee: REP IP AG, Zug (CH)

( * ) Notice: Subject to any disclaimer, the term of this patent is extended or adjusted under 35 U.S.C. 154(b) by 364 days.

(21) Appl. No.: 17/058,906

(22) PCT Filed: May 28, 2019

(86) PCT No.: PCT/IB2019/054404
§ 371 (c)(1),
(2) Date: Nov. 25, 2020

(87) PCT Pub. No.: WO2019/229646
PCT Pub. Date: Dec. 5, 2019

(65) Prior Publication Data
US 2021/0207867 A1  Jul. 8, 2021

(30) Foreign Application Priority Data

May 29, 2018 (AT) .................................. A 157/2018

(51) Int. Cl.
*F25D 3/08* (2006.01)
*B65D 81/18* (2006.01)
*B65D 81/38* (2006.01)

(52) U.S. Cl.
CPC ............... *F25D 3/08* (2013.01); *B65D 81/18* (2013.01); *B65D 81/3818* (2013.01);
(Continued)

(58) Field of Classification Search
CPC ................. F25D 3/08; F25D 2303/083; F25D 2303/085; B65D 81/18; B65D 81/3818; B65D 81/3823
See application file for complete search history.

(56) References Cited

U.S. PATENT DOCUMENTS

2012/0180707 A1 * 7/2012 DelloRusso, Jr. ...... E05G 1/024
109/64
2013/0255306 A1 * 10/2013 Mayer ...................... F25D 3/08
62/457.2
(Continued)

FOREIGN PATENT DOCUMENTS

DE     202007013140 U1 *  3/2009  ............. C09K 5/063
DE     102014007987 A1     12/2015
(Continued)

OTHER PUBLICATIONS

International Preliminary Examination Report dated Aug. 28, 2020 issued in corresponding International Patent Application No. PCT/IB2019/054404 (17 pgs ).
(Continued)

*Primary Examiner* — Emmanuel E Duke
(74) *Attorney, Agent, or Firm* — Pillsbury Winthrop Shaw Pittman, LLP

(57) ABSTRACT

In a transport container for transporting temperature-sensitive transport goods, there is a chamber for receiving the transport goods and a shell enclosing the chamber. The shell has at least one first latent heat storage element wherein the heat storage element is arranged in a heat exchanging relationship with the chamber. The at least one first latent heat storage element includes a carrier material which is dimensionally stable at use temperature, and a phase change material distributed within the mass of the carrier material, so that the at least one first latent heat storage element is dimensionally stable in a temperature range both below and
(Continued)

Figure 1:
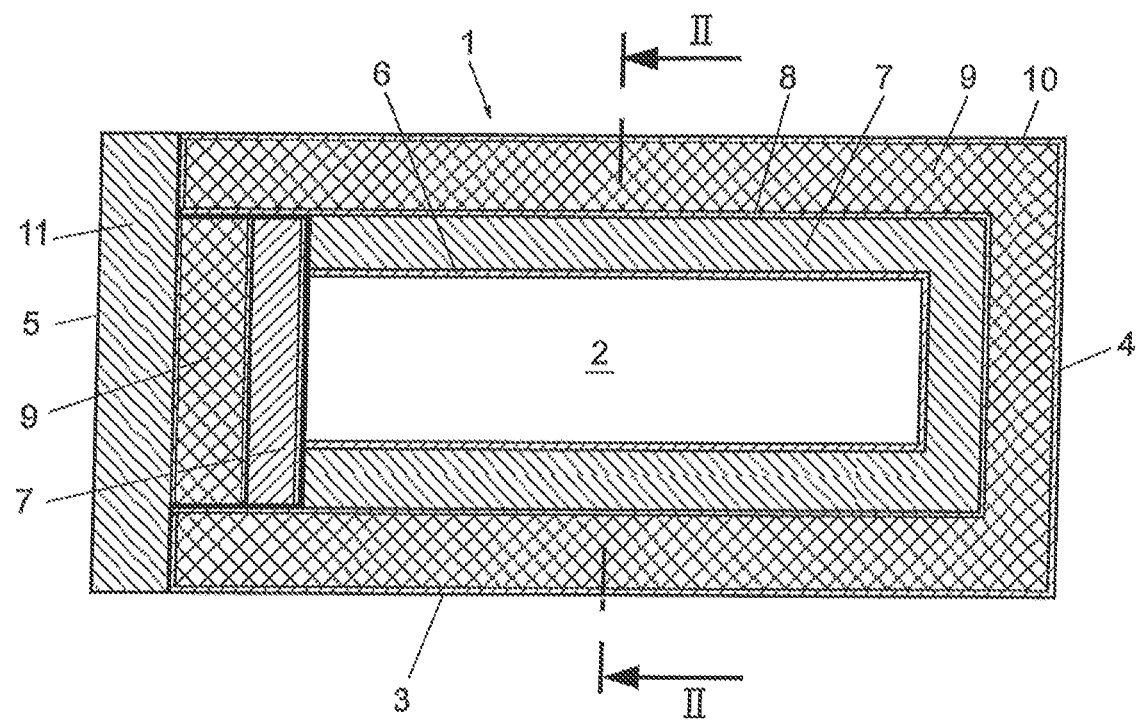

above the melting point of the phase change material. The at least one first latent heat storage element is designed as a casting part which surrounds the chamber in one piece, seen in cross section, at least over half the circumference.

18 Claims, 1 Drawing Sheet

(52) U.S. Cl.
CPC .... *B65D 81/3823* (2013.01); *F25D 2303/083* (2013.01); *F25D 2303/085* (2013.01)

(56) References Cited

U.S. PATENT DOCUMENTS

| | | | | |
|---|---|---|---|---|
| 2014/0021208 A1* | 1/2014 | Anti | ........................ | F25D 3/125 |
| | | | | 220/592.25 |
| 2014/0060599 A1* | 3/2014 | Hotes | ...................... | E04H 15/10 |
| | | | | 29/592.1 |
| 2016/0362240 A1* | 12/2016 | Ferracamo, Jr. | ........ | A61J 1/165 |

FOREIGN PATENT DOCUMENTS

| | | | | | |
|---|---|---|---|---|---|
| DE | 202016006499 | U1 | | 1/2018 | |
| EP | 2022728 | A1 | * | 2/2009 | ......... B29C 44/1266 |
| EP | 2221569 | B1 | * | 6/2016 | ........... B31D 5/0086 |
| EP | 3128266 | A1 | * | 2/2017 | .............. A61J 1/165 |
| EP | 3128266 | A1 | | 2/2017 | |
| JP | 2009019857 | A | * | 1/2009 | ........... F28D 20/023 |
| WO | 00/11424 | A1 | | 3/2000 | |
| WO | WO-2008137883 | A1 | * | 11/2008 | ............... F25D 3/08 |
| WO | 2010/132726 | A1 | | 11/2010 | |
| WO | 2017/207974 | A1 | | 12/2017 | |
| WO | WO-2017207974 | A1 | * | 12/2017 | ............. B65D 81/38 |
| WO | 2018/029522 | A1 | | 2/2018 | |

OTHER PUBLICATIONS

International Search Report dated Sep. 20, 2019 issued in corresponding International Patent Application No. PCT/IB2019/054404 (16 pgs.).

* cited by examiner

TRANSPORT CONTAINER FOR TRANSPORTING TEMPERATURE-SENSITIVE TRANSPORT GOODS

CROSS-REFERENCE TO RELATED APPLICATIONS

This application is a national stage entry of PCT/IB2019/054404, filed May 28, 2019, which claims priority to Austrian Application No. A 157/2018, filed May 29, 2018, the entire contents of all of which are herein incorporated by reference in their entireties.

The invention relates to a transport container for transporting temperature-sensitive transport goods, comprising a chamber for receiving the transport goods and a shell enclosing the chamber, wherein the shell comprises at least one first latent heat storage element, wherein the heat storage element is arranged in a heat exchanging relationship with the chamber, wherein the heat storage element comprises a carrier material which is dimensionally stable at use temperature and a phase change material distributed within the mass of the carrier material, so that the at least one first latent heat storage element is dimensionally stable in a temperature range both below and above the melting point of the phase change material.

When transporting temperature-sensitive goods, such as pharmaceuticals, over periods of several hours or days, specified temperature ranges must be observed during storage and transport in order to ensure the usability and safety of the goods. For various drugs, temperature ranges from 2 to 25° C., in particular 2 to 8° C. or 15 to 25° C., are specified as storage and transport conditions.

The desired temperature range can be above or below the ambient temperature, so that either cooling or heating of the interior of the transport container is necessary. If the ambient conditions change during a transport process, the required temperature control can include both cooling and heating. Transport containers with special insulation properties are used to ensure that the desired temperature range is permanently and verifiably maintained during transport. These containers are equipped with passive or active temperature control elements.

Active temperature control elements require an external energy supply for their operation. They are based on the conversion of a non-thermal form of energy into a thermal form of energy. The release or absorption of heat takes place, for example, as part of a thermodynamic cycle, such as by means of a compression refrigeration machine. Another design of active temperature control elements works on the basis of the thermoelectric principle, so-called Peltier elements being used. Because of the complex structure of the active temperature control elements, containers of this type are expensive and relatively large. Furthermore, it is inherent to such system that they are dependent on an energy supply. If there is no energy supply, the containers cannot be cooled or heated.

Passive temperature control elements do not require any external energy supply during use, but use their heat storage capacity, with heat being released or absorbed to or from the interior of the transport container, depending on the temperature level. However, such passive temperature control elements are exhausted as soon as the temperature equalization with the interior of the transport container is complete.

A special form of passive temperature control elements are latent heat accumulators that can store thermal energy in phase change materials, the latent heat of fusion, heat of solution or heat of absorption of which is significantly greater than the heat that they can store due to their normal specific heat capacity. The disadvantage of latent heat accumulators is the fact that they lose their effect as soon as all of the material has completely passed through the phase change. However, by executing the opposite phase change, the latent heat storage can be recharged.

In the case of conventional cooled transport containers, water/ice can be used as latent heat storage. Even if the amount of energy stored in water is very large, this energy storage has the disadvantage that the phase transition takes place at 0° C. Most of the energy is stored in the phase transition. However, other temperature ranges are important for pharmaceutical products, for example 2 to 20° C., 2 to 8° C. and 15° C. to 25° C.

For this reason, phase change materials are increasingly being used in which the phase transition temperature can be shifted into the required ranges. The disadvantage of these materials is that they are only solid and thus dimensionally stable below their melting point. Phase change materials are liquid above the phase transition temperature and must therefore be arranged in suitable containers, which, however, is associated with high costs and low efficiency. The most inefficient are designs in which the phase change material is filled into battery-like containers, which must be exchanged before each use of the transport container. This approach requires additional work. In addition, there is a greater probability that the wrong containers, which do not cover the desired temperature range, are installed inadvertently. Even if the battery-like containers are permanently installed in a transport container, handling phase change materials is not trivial. Phase change materials can diffuse through a wide variety of materials, so that special containers are required which prevent this behavior, but this is associated with additional costs. In addition, there are limitations in the shape of the latent heat storage container, which in turn makes it difficult to handle during the installation into the transport container and requires more space and weight.

For this reason, latent heat storage elements are already known which, through the addition of various additives, are dimensionally stable in a temperature range both below and above the melting point of the phase change material. Thereby the problems with the handling of the latent heat storage can be avoided. In particular, it is not necessary to arrange latent heat storage devices of this type in battery-like containers. Rather, latent heat storage of this type can be prefabricated as dimensionally stable elements, for example in plate form, and installed in specially provided receiving chambers of the transport container. However, it is also disadvantageous here that the manufacturing cost of the transport container is high due to the large number of manufacturing steps. A further disadvantage is that the structure is complicated with regard to the receiving chambers, results in a high weight and the design options are limited.

The aim of the invention is now to provide a transport container of the type mentioned at the outset with which the above-mentioned disadvantages can be overcome. In particular, the transport container shall have low manufacturing costs, a low weight and a small wall thickness and, at the same time, high performance, in particular a high insulation value and a large energy storage capacity.

To achieve this object, the invention essentially provides for a transport container of the type mentioned at the outset, wherein the at least one first latent heat storage element is formed as a cast part surrounding the chamber in one piece, seen in cross section, over the entire circumference. This makes use of the fact that, according to the invention, the latent heat storage material is dimensionally stable in the temperature range around the melting point of the phase change material, but can be liquefied at high temperatures. This means that the latent heat storage device can be cast and any complex shape can be produced. This enables great freedom in the development and optimization of transport containers, especially for pharmaceutical products, and also brings great cost advantages. In particular, with the same space requirement, more latent heat storage material can be arranged in the transport container, as a result of which the possible cooling or heating capacity of the transport container is increased. Due to the design of the latent heat storage element as a cast part, the separate production of individual plate-shaped elements for each wall element of the transport container can be dispensed with. Rather, latent heat storage elements can be formed which extend over a larger circumference of the shell than over just one wall of the transport container, namely at least over half the circumference. As a result, the shell can, for example, comprise only two or three latent heat storage elements which together completely enclose the chamber. Furthermore, the production can be simplified in that parts of the shell structure are used as a casting mold for the latent heat storage element(s) produced as a cast part(s).

It is preferably provided that the at least one first latent heat storage element is designed as a cast part surrounding the chamber in one piece over the entire circumference, seen in cross section. The latent heat storage element here forms a jacket surrounding the chamber, only the remaining two boundary surfaces, such as the floor and the ceiling, if necessary, needing to be separately provided with a latent heat storage element. In this embodiment, the number of parts required for the transport container is reduced even further and a simple and inexpensive, but at the same time efficient transport container is created.

Furthermore, it is preferably provided that the at least one first latent heat storage element has a jacket section that completely surrounds the chamber and a bottom section closing the jacket section on the bottom, the jacket section and the bottom section being formed in one piece with one another. More generally, the at least one first latent heat storage element can be formed as an element completely and in one piece surrounding the cuboid chamber on five surfaces of the cuboid. This enables a further reduction in the parts required for the transport container, only the sixth side, such as a door element opening or closing access to the chamber, can or must be provided with a separate latent heat storage element.

It is preferably provided here that the transport container furthermore has a lid or a door in order to completely close the chamber together with the other five walls, such as the jacket and bottom sections. The lid or the door can optionally be opened to allow access to the chamber. The lid or the door preferably also has a latent heat storage element. The lid or the door is particularly preferably constructed essentially in the same manner as the other walls, such as the casing and bottom sections. The lid or the door preferably also has an additional further insulating layer in order to seal the connection between the lid or the door and the jacket section as well as possible.

Alternatively, it is provided that a second latent heat storage element designed as a cast part is provided, the first and second latent heat storage elements together forming a jacket section that completely surrounds the chamber and possibly a bottom section closing the casing section on the bottom. In this embodiment, at least two latent heat storage elements are provided which together surround the chamber with the exception of the lid or the door. This structure enables a more flexible production from several parts, which are produced separately from one another and are only put together accordingly when the transport container is assembled. Three or more latent heat storage elements can also be provided. For example, the latent heat storage elements can also be arranged in layers one above the other.

In a preferred embodiment it is provided that the shell is double-walled with an inner wall and an outer wall and a cavity arranged therebetween and that the at least one first latent heat storage element is arranged in the cavity. If a plurality of latent heat storage elements are provided, all latent heat storage elements are preferably arranged in the cavity. The inner wall of the shell here faces the chamber and confines it in a preferred embodiment. The outer wall of the shell is preferably formed by the outer wall of the transport container. In this cavity, the latent heat storage is preferably arranged to contact the inner wall at least in sections, particularly preferably over the entire circumference.

Furthermore, it is preferably provided that the phase change material consists of paraffin, for example n-tetradecane or n-hexadecane, esters, for example methyl esters, linear alcohols, ethers, organic anhydrides, salt hydrates, water-salt mixtures, salt solutions and/or water-based solutions. These materials have the advantage that they have a suitable phase transition temperature.

In addition to the phase change material, the latent heat storage element preferably comprises one or more copolymers, in particular styrene block copolymers, and/or ethylene-butylene copolymers, as carrier material in order to ensure the dimensional stability of the latent heat storage element above the melting point of the phase change material.

It is preferably provided that the latent heat storage element is dimensionally stable in a temperature range of 5° C., preferably 10° C., particularly preferably 15° C., above the phase transition temperature of the phase change material. This ensures that the latent heat storage element continues to be dimensionally stable even at higher temperatures.

A particularly simple and inexpensive to manufacture transport container is created if the latent heat storage element is manufactured by an injection molding process. Injection molding processes have long been known and can therefore be used easily and safely. In particular, even complex shapes can be produced in a simple manner using injection molding processes.

Furthermore, it is preferably provided that the phase change material has a phase transition temperature of 3-10° C., in particular approx. 5° C. A transport container with a latent heat storage having such a phase change material can be used particularly well for transporting medicaments.

The latent heat storage preferably consists of at least two layers, which particularly preferably have phase change materials with different phase transition temperatures. This allows the desired temperature range to be set easily and efficiently.

In order to further increase the efficiency of the transport container, an insulating layer surrounding the chamber is preferably provided, which is preferably arranged outside the at least one first latent heat storage element or the latent heat storage layer. The insulating layer is therefore arranged on the side of the latent heat storage element facing away from the chamber. Several insulating layers can also be arranged one above the other.

In order to obtain particularly good insulation of the chamber, it is preferably provided that the insulating layer is formed by a gas, for example air, $CO_2$, krypton, xenon or a mixture of these gases, which preferably has a negative pressure compared to the environment.

In order to further improve the insulation of an insulating layer filled with a gas, it is preferably provided that the insulating layer is subdivided by at least one intermediate layer, preferably a film, arranged within the insulating layer. The at least one intermediate layer is preferably essentially parallel to the outer and/or inner wall and preferably coated on one or both sides with a reflective layer, in particular aluminum. If the thickness of the insulating layer is too great, undesirable convection can take place within the insulating layer. In order to prevent this, the at least one intermediate layer preferably divides the insulating layer into at least two regions, each with a smaller thickness. Since the ideal layer thickness is different for different gases, it is preferably provided that the intermediate layers are designed in such a way that they can optionally be arranged in the insulating layer or removed from the insulating layer. This allows the insulating layer to be adapted to the gas used in each case. The intermediate layer can preferably be designed with heat-reflecting properties on one or both sides, in particular as a reflective layer. The reflective layer can be formed by a metallic, in particular gas-tight, layer, preferably a layer with an emissivity of <0.5, preferably <0.2, particularly preferably <0.04, such as a layer made of aluminum.

It is furthermore preferably provided that an intermediate wall is arranged between the at least one first latent heat storage element and the insulating layer, which is preferably coated with a reflective layer on the side facing the insulating layer. This arrangement allows for the heat radiation into the chamber to be further reduced.

Alternatively, it is preferably provided that the insulating layer is confined on the inside by the at least one first latent heat storage element, the at least one first latent heat storage element preferably being coated with a reflective layer on the side facing the insulating layer. With this arrangement, the heat radiation into the chamber can be further reduced, furthermore no separate intermediate wall is required between the latent heat storage element and the insulating layer and the structure of the transport container is therefore simplified.

In a preferred embodiment it is provided that the insulating layer is confined on the outside by an outer wall which is preferably coated with a reflective layer on the side facing the insulating layer. This arrangement allows for the heat radiation into the chamber to be further reduced.

It is preferably provided here that the reflective layer(s) is/are made of a metallic, in particular gas-tight, coating, preferably a coating with an emissivity of <0.5, preferably <0.2, particularly preferably <0.04, such as a coating made of aluminum. If several reflective layers are provided, all reflective layers are particularly preferably made of the same material.

The transport container according to the invention can particularly preferably be cuboid, with five closed sides being provided and the cuboid having an opening on one side in order to fill or empty the chamber. The opening can preferably be closed with a lid or a door which is furthermore preferably connected to the transport container, for example with hinges.

Furthermore, according to the invention a method for producing a transport container according to the invention is provided, wherein the at least one first latent heat storage element, preferably the first and a second latent heat storage element, is/are produced by a casting process, in particular an injection molding process. This enables simple and inexpensive production of a transport container.

The latent heat storage can preferably be poured directly into a cavity formed by an outer wall and/or inner wall of the transport container. The container is then optionally completed, for example by connecting the outer wall and the inner wall to one another, in particular by welding them.

A preferred procedure provides that an inner wall body is provided, which forms inner walls that confine the cuboid chamber on five sides, a mold is positioned around the inner wall body, which forms mold walls that are each parallelly associated to the walls of the inner wall body so that a cavity is formed between the walls of the inner wall body and the walls of the mold, latent heat storage material is poured into the cavity and allowed to solidify, and the mold is then removed. A preferred development of the method provides that the outer surface of the latent heat storage element that is exposed by the removal of the mold is provided with a reflective layer, such as a metal foil, in particular an aluminum coating, the inner wall body together with the latent heat storage element formed thereon is positioned in an outer wall body, which forms outer walls assigned parallel to the outer surfaces of the latent heat storage element, so that a cavity is formed between the outer surfaces of the latent heat storage element and the walls of the outer wall body, which cavity is closed and then filled with a gas. Optionally, the inner surface of the outer wall body can be provided with a reflective layer, such as a metal foil, in particular an aluminum coating.

Said method can preferably also be modified in such a way that instead of the mold, an intermediate wall body is provided, which forms intermediate walls assigned parallel to the walls of the inner wall body, so that a cavity is formed between the walls of the inner wall body and the walls of the intermediate wall body, into which latent heat storage material is poured and allowed to solidify. This enables a higher productions cycle frequency within the scope of the manufacturing process, because the mold for the formation of the cast part, namely the latent heat storage element, is confined on both sides of the cavity by a shape-limiting element, namely the inner wall body and the intermediate wall body, which remains as part of the transport container to be produced so that allowing the mold halves to cool after the casting process does not require any downtime for an otherwise necessary separate mold.

On the side facing away from the latent heat storage element, the intermediate wall body can optionally be provided with a reflective layer such as a metal foil, in particular an aluminum coating.

The inner wall body, the outer wall body and, if applicable, the intermediate wall body can be made from a plastic, in particular as an injection molded part each.

Alternatively, the latent heat storage can preferably first be cast in a separate casting mold and then arranged in the transport container.

Figure 2:
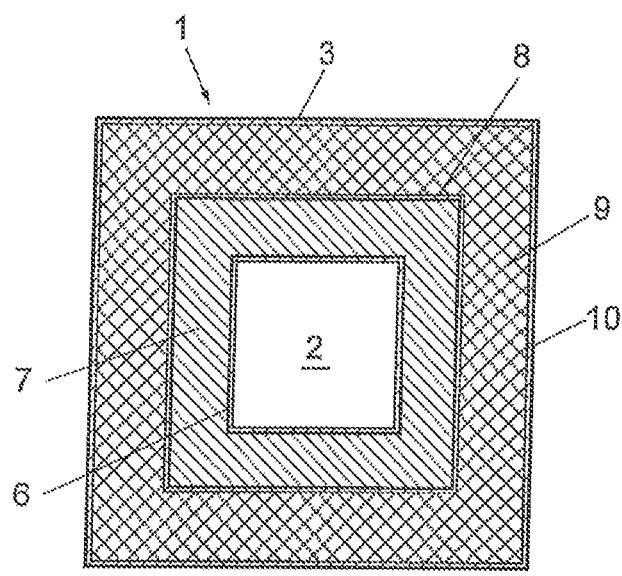

The invention is explained in more detail below with reference to exemplary embodiments shown schematically in the drawing. FIG. 1 shows a transport container according to the invention in a first section and FIG. 2 shows the transport container according to FIG. 1 in a second section.

In FIG. 1, a transport container according to the invention is shown in longitudinal section. The transport container is cuboid and comprises a shell 1 which encloses a chamber 2 on all sides. The chamber 2 is used to receive goods to be transported. The shell 1 comprises a jacket section 3 which, in the cross section shown in FIG. 2, surrounds the chamber 2 circumferentially, i.e. on four sides. The shell 1 further comprises a bottom section 4 connected in one piece to the jacket section 3, the jacket section 3 and the bottom section 4 together defining the chamber 2 on five sides. The sixth side of the chamber 2 is closed by the lid 5, which can be opened to enable access to the chamber 2.

The shell 1 has a layer structure in the jacket section 3 and in the bottom section 4 which, viewed from the inside to the outside, comprises an inner wall 6, a layer of a latent heat storage 7, an intermediate wall 8, an insulating layer 9 and an outer wall 10. The lid 5 can have the same layer structure. The inner walls 6 of the five sides formed by the jacket section 3 and the bottom section 4 together form an inner wall body which is formed in one piece and is preferably produced by an injection molding process. The intermediate walls 8 of the five sides formed by the jacket section 3 and the bottom section 4 together form an intermediate wall body which is formed in one piece and is preferably produced by an injection molding process. The outer walls 10 of the five sides formed by the jacket section 3 and the bottom section 4 together form an outer wall body which is formed in one piece and is preferably produced by an injection molding process.

The cavity formed by the inner wall body and the intermediate wall body is completely filled by a latent heat storage element 7, which is designed as a cast body, the production preferably taking place in such a way that the material of the latent heat storage element is heated above the softening point and poured into the cavity and then allowed to solidify.

The cavity formed by the outer wall body and the intermediate wall body is completely filled by a gas, whereby an insulating layer 10 is formed. The surface of the intermediate wall 8 and/or the outer wall 10 facing the gas space can be provided with a reflective coating over the entire area.

In this embodiment, the lid 5 also has a further insulating layer 11 in order to seal the connection between the lid 1 and the jacket section 3.

FIG. 2 shows a cross section of the transport container of the invention according to section II-II of FIG. 1. It can be seen that the latent heat storage 7 surrounds the chamber 2 in one piece over the entire circumference. The inner wall 6, the intermediate wall 8, the insulating layer 9 and the outer wall 10 also surround the chamber 2 over the entire circumference.

In an alternative design of the transport container, not shown, the intermediate wall 8 is omitted so that the latent heat storage element 7 confines the insulating layer 9, i.e. the gas space, on the inner side. The latent heat storage element 7 can be provided with a reflective coating over the entire area on the surface facing the gas space.

The invention claimed is:

1. A transport container for transporting temperature-sensitive transport goods, comprising a chamber for receiving the transport goods and a shell enclosing the chamber wherein the shell comprises at least one first latent heat storage element, wherein the at least one first latent heat storage element is arranged in a heat exchanging relationship with the chamber, wherein the at least one first latent heat storage element comprises a carrier material in the form of a cast body which is dimensionally stable at use temperature and a phase change material distributed within a solidified mass of the carrier material, so that the at least one first latent heat storage element is dimensionally stable in a temperature range both below and above the melting point of the phase change material, wherein the at least one first latent heat storage element is a cast part which surrounds the chamber in one piece, seen in cross section, at least over half a circumference of the chamber.

2. The transport container according to claim 1, wherein the at least one first latent heat storage element is formed as a cast part surrounding the chamber in one piece, seen in cross section, over the entire circumference.

3. The transport container according to claim 1, wherein the at least one first latent heat storage element has a jacket section which completely surrounds the circumference of the chamber and a bottom section closing the jacket section on a bottom side thereof, wherein the jacket section and the bottom section are formed integrally with one another.

4. The transport container according to claim 1, wherein further a second latent heat storage element designed as a cast part is provided, the first and the second latent heat storage elements together forming a jacket section which completely surrounds the circumference of the chamber and forming a bottom section closing the jacket section on a bottom side thereof.

5. The transport container according to claim 4, wherein an insulating layer surrounding the chamber is provided, which is arranged outside the at least one first latent heat storage element.

6. The transport container according to claim 1, wherein the shell is double-walled comprising an inner wall and an outer wall and a cavity arranged therebetween and the at least one first latent heat storage element is arranged in the cavity.

7. The transport container according to claim 1, wherein the phase change material is formed from paraffin, esters, linear alcohols, ethers, organic anhydrides, salt hydrates, water-salt mixtures, salt solutions and/or water-based solutions.

8. The transport container according to claim 1, wherein the at least one first latent heat storage element is dimensionally stable in a temperature range of 5° C. to 15° C. above a phase transition temperature of the phase change material.

9. The transport container according to claim 1, wherein the at least one first latent heat storage element is an injection molded cast part.

10. The transport container according to claim 1, wherein the phase change material has a phase transition temperature of 3-10° C.

11. The transport container according to claim 1, wherein an insulating layer surrounding the chamber is provided, which is arranged outside the at least one first latent heat storage element.

12. The transport container according to claim 11, wherein the insulating layer is formed from a gas which has a negative pressure compared to the environment.

13. The transport container according to claim 11, wherein an intermediate wall is arranged between the at least one first latent heat storage element and the insulating layer, the intermediate wall being coated with a reflective layer on a side facing the insulating layer.

14. The transport container according to claim 11, wherein the insulating layer is confined on the inside by the at least one first latent heat storage element, wherein the at least one first latent heat storage element is coated with a reflective layer on a side facing the insulating layer.

15. The transport container according to claim 14, wherein the reflective layer consists of a metallic coating with an emissivity of <0.5.

16. The transport container according to claim 11, wherein the insulating layer is confined on the outside by an outer wall which is coated with a reflective layer on a side facing the insulating layer.

17. The transport container according to claim 16, wherein the reflective layer consists of a metallic coating with an emissivity of <0.5.

18. A method for producing the transport container according to claim 1, wherein the at least one first latent heat storage element is an injection molded cast part.

* * * * *